(No Model.) 3 Sheets—Sheet 1.
J. HOWES.
FILTERING APPARATUS.
No. 360,441. Patented Apr. 5, 1887.
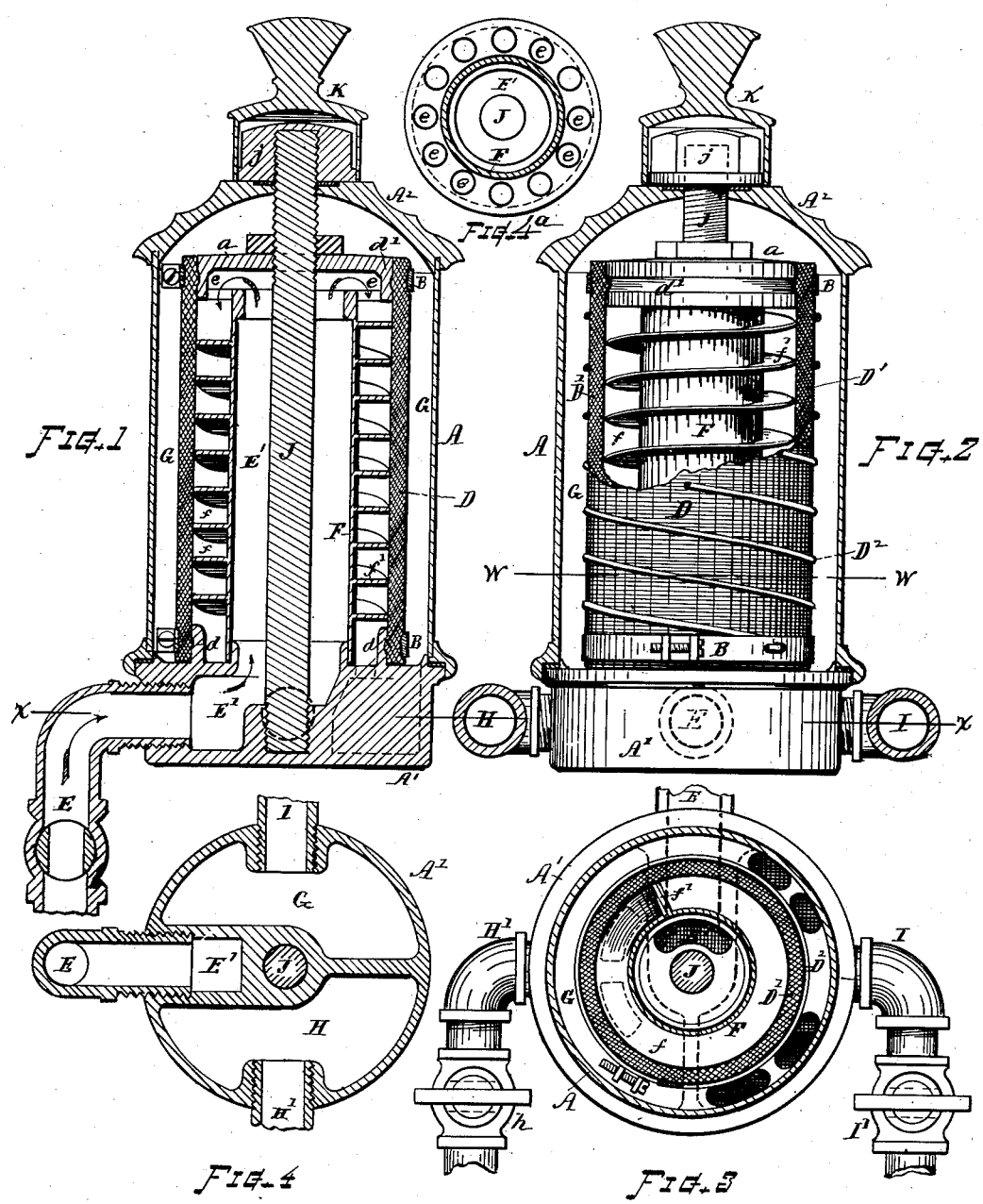
WITNESSES
Simeon E. King
Geo. M. Rice 2d
INVENTOR
John Howes
By Chas H. Burleigh
Atty.

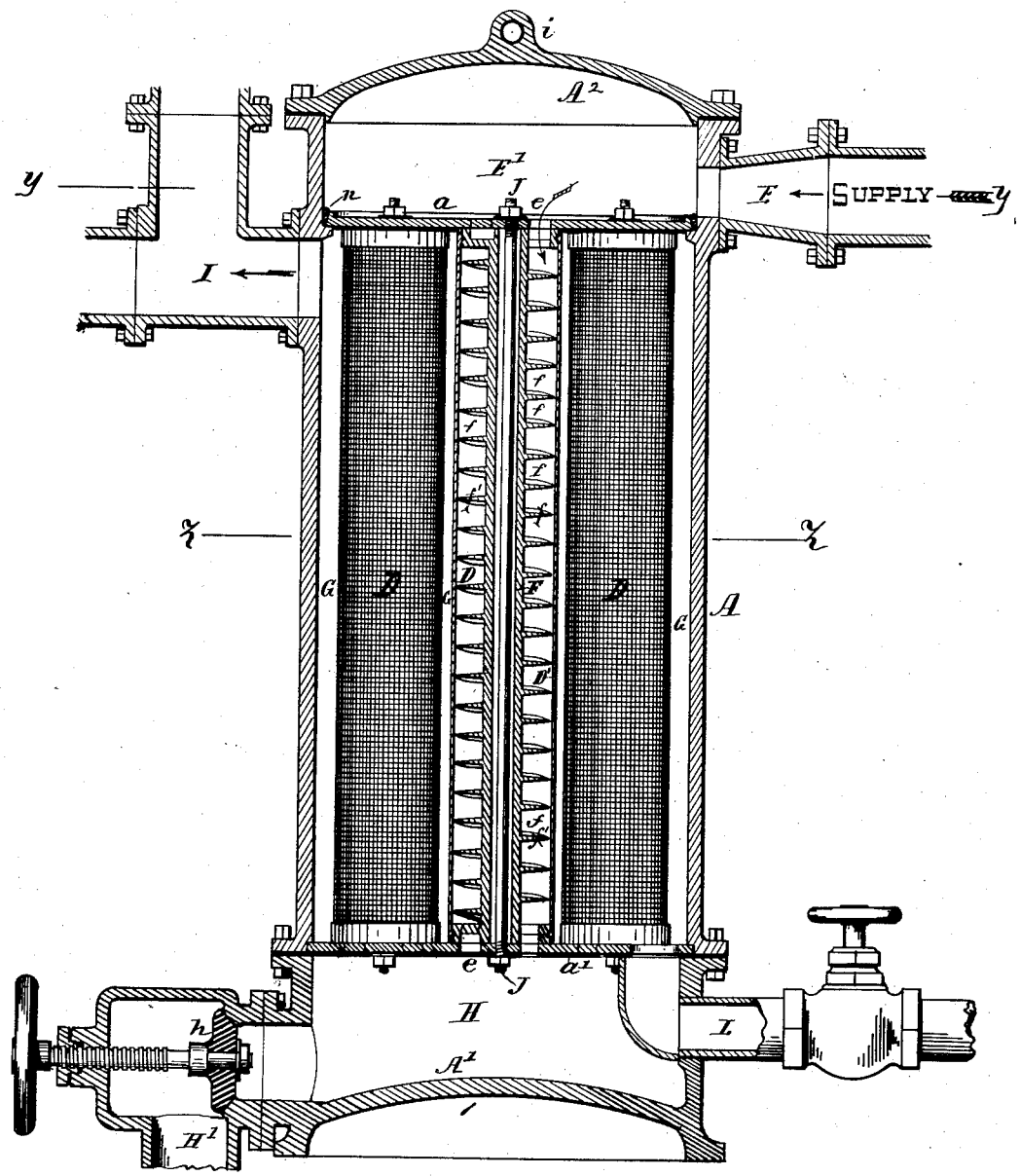

(No Model.) 3 Sheets—Sheet 3.
J. HOWES.
FILTERING APPARATUS.
No. 360,441. Patented Apr. 5, 1887.
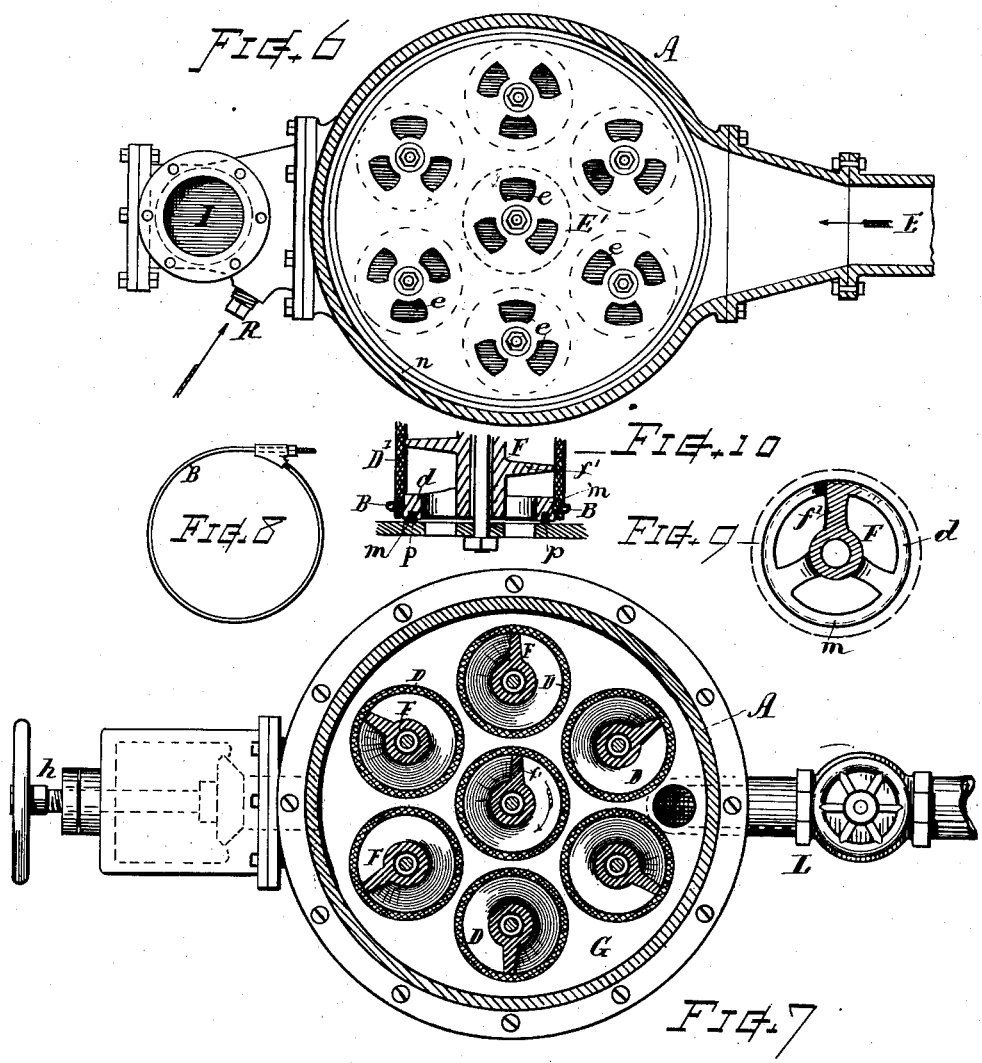

UNITED STATES PATENT OFFICE.

JOHN HOWES, OF WORCESTER, MASSACHUSETTS.

FILTERING APPARATUS.

SPECIFICATION forming part of Letters Patent No. 360,441, dated April 5, 1887.

Application filed July 25, 1885. Serial No. 172,600. (No model.)

*To all whom it may concern:*

Be it known that I, JOHN HOWES, a citizen of the United States, residing at Worcester, in the county of Worcester, and State of Massachusetts, have invented certain new and useful Improvements in Filtering Apparatus; and I declare the following to be a description of my said invention, sufficiently full, clear, and exact to enable others skilled in the art to which it appertains to make and use the same, reference being had to the accompanying drawings, which form a part of this specification.

The object of my present invention is to provide a filter having a large area of filtering-surface and occupying but a comparatively small space, to provide apparatus having one or more filtering-cylinders provided with spiral or helical channels interior of the filtering-cylinders for conducting the liquid to the inner surface of the filtering material, also suitable chambers for the unfiltered and filtered liquid and means for the cleansing of the chambers and passages wherein the sediment is deposited, and to perfect the details of construction and make an apparatus adapted for large or small service, which can be manufactured with economy and maintained for practical operation with little trouble and expense. These objects I attain by an apparatus constructed and operating in the manner illustrated and hereinafter explained, the particular subject-matter claimed being hereinafter definitely specified.

In the drawings, Figure 1 is a vertical section of a filtering apparatus embracing my improvements as adapted and applied in a small filter for the purposes of ordinary household water service and in which the inlet and outlet connections are at or near the same level. Fig. 2 is a sectional view showing portions of the interior parts in side elevation to more fully illustrate the construction thereof. Fig. 3 is a horizontal section at line $w\ w$, Fig. 2. Fig. 4 is a horizontal section at line $x\ x$. Fig. $4^a$ is a bottom view of the head of the filter-cylinder. Fig. 5 is a vertical central section of an apparatus embracing my invention as adapted and applied in a larger filter for manufacturing purposes and with the inlet and outlet connections at different levels, respectively at the top and bottom of the filter. Fig. 6 is a horizontal section through the head-chamber at line $y\ y$ in Fig. 5. Fig. 7 is a horizontal section through the filtering-chamber at line $z\ z$, Fig. 5. Fig. 8 is a view of the clamp for securing the filtering material. Fig. 9 is a section of one of the filter-distending shafts or cores. Fig. 10 shows the packing at the ends of the filter distending shafts.

In referring to parts, A denotes the outer shell or cylinder, which is supported on a base-section, A', and provided with a suitable top or head, $A^2$, which parts together form a tight casing, within which the filtering devices are inclosed.

The filter-cylinders D consist of a tube or tubes of felt, D', distended and supported about a helically-flanged core or screw-shaped shaft, F, having suitable heads or circular ends, $d\ d'$, to which the felt is firmly secured by clamping-rings B, which embrace the ends of the tubes and bind them to the periphery of the heads $d\ d'$, as indicated. The felt may be protected and re-enforced by a cylinder of wire-gauze, perforated sheet metal, or a spiral coil of wire, $D^2$, arranged about the outside of the tube, also at the interior of the felt, if desired. One or more of these tubular spirally-cored filter-cylinders may be arranged within a single casing-cylinder, A, according to the capacity of the apparatus required. They are arranged in a manner to allow of the supply-liquid to circulate through the internally-disposed helical channel $f$, along the inner surface of the filtering material D', from whence it percolates through to the exterior or surrounding chamber, G, from which the filtered water or liquid can be drawn or conducted, as required.

I have shown two forms in which I construct my improved filter, one being adapted for small filters for household purposes, the other for large filters, such as may be used for manufacturing purposes, or where large quantities of liquid are to be filtered. Sheet 1 illustrates the construction of the small or single filter-cylinder apparatus. In this the outer cylinder, A, may practically be made about three to six inches (more or less) in diameter. Sheets 2 and 3, on which the drawings are made to a smaller scale, illustrate the duplex or compound construction of apparatus, wherein the outer cylinder may be two or three feet (more or less) in diameter.

The filter made as shown on Sheet 1 is more economical of construction than the form shown on Sheets 2 and 3, and is therefore more desirable for small filters, while the compound form gives a proportionally greater area of filtering-surface in a given size or bulk, and is therefore better adapted for large filters for use in factories and other situations when large quantities of liquid have to be treated in short space of time. In the present illustrated compound construction seven filtering-cylinders or tubular felts are shown; but any other number may be used, if most convenient or preferred.

The core or helically-flanged shaft F in large-sized filtering apparatus may be constructed of cast-iron, with a central pipe of wrought-iron laid into the mold when casting, thus leaving a hole through the length of the helical shaft for the clamping-bolt. This construction is a very convenient and economical method for the long shafts, such as are shown on Sheet 2 of the drawings. Another method of construction is to turn a thin spiral band and attach it at its inner edge to a cylindrical pipe by soldering, or in other manner, as in Figs. 1 and 2. The helix may be constructed in any other suitable manner whereby the requisite shape is produced. The screw or flange $f'$ of the helix may be single or double threaded, as desired, the number of channels $f$ of course corresponding with the number of separating-flanges $f'$.

E indicates the supply-pipe, which conducts the liquid into a chamber, E', that communicates by suitable passages, $e$, with the helical channel $f$ within the filtering-cylinders D. In the small filter, Fig. 1, the chamber E' is at the lower part of the apparatus, and a passage extends up through the interior of the filter-supporting shaft to deliver the liquid into the top of the helical passages $f$, while in the large apparatus the chamber E' is at the top and the openings $e$ are direct through the disk which separates said chamber E' from the filter-chamber G, which surrounds the filter-cylinders D. A stop-cock, $E^2$, may be arranged in the supply-pipe E.

H indicates a chamber for sediment or dirty water, with which the lower ends of the helical passages $f$ communicate, and H' denotes the waste or discharge passage fitted with a suitable cock or valve, $h$, for the purpose of cleansing the apparatus by permitting a rapid flow of liquid through the passages and out at the discharge.

I denotes the pipe or passage through which the clear or filtered liquid is drawn from the chamber. Said pipe may lead to a draft-cock, I', or to a storage-tank at any convenient locality.

J indicates a bolt or rod passing longitudinally through the center of the filter-shaft F, for connecting the upper and lower heads, $a$ $a'$, and for retaining the parts of the apparatus in position. In the small-sized filter the bolt J is extended at the top, so as to pass through the head $A^2$ of the cylinder A, and is provided with a second nut, $j$, for holding said cylinder down upon the base A'. If desired, an ornamental cap, K, may be fitted over the nut to give a neat finish. In large filtering apparatus the head may be bolted onto the cylinder in the manner indicated in Fig. 5, and a ring, $i$, may be fixed on the head for the connection of a crane or hoist for lifting off the head when it is desired to have access to the interior. The ends of the helically-channeled filter-shafts F may be formed with annular bearing-rings $m$, as in Fig. 10, with grooves for receiving packing-gaskets $p$, so as to make tight joints with the surface of the head plates or disks $a$ $a'$, when the nuts or bolts J are turned down, and said heads are properly packed at $n$ to give a tight joint between their edges and the outer cylinder, A.

A passage and cock, L, may be employed in large filtering apparatus for drawing off and cleansing the chamber G, when desired.

In the operation of my improved filtering apparatus the water or liquid enters the chamber E' and passes into the helical channels $f$, within the filtering-cylinders D, thence through the felt or filtering material D' to the chamber G, leaving the dirt and sediment deposited on the inner surface of the felt D'. To remove the dirt from the filter, the waste-valve H' is opened, which causes a rapid flow of liquid through the helical channels $f$, washing off the deposit from the felt and carrying it away through the waste H.

In the best adaptation of large filtering apparatus in practice it is proposed to conduct the filtered water to a reservoir or storage-tank situated at some convenient height above the level of the filter, and I have in a separate application for Letters Patent described and claimed a system of service and tank apparatus of suitable construction to illustrate this practice, so that it will be unnecessary to show or describe more than the action of the filter herein.

The action from the high level tank serves to further facilitate cleaning off the felt, as the filtered water deposited in a tank above the filter flows back reversely through the filtering material when the waste-valve is open, thereby releasing the deposited sediment, while the general circulating-current carries it away, and to make this still more effectual the waste-pipe is carried as far below the filter as practical. This will tend to produce a vacuum in the filter, which will increase the power both of the general current and the reverse flow of the filtered water.

Among the advantages of the construction herein shown and described may be mentioned the facility and economy of manufacture and maintenance. The felt for small-sized tubes costs less than for large sheets, and is less liable to have imperfections when made in small sheets than in large. Felt of the proper quality can be constructed in narrow sheets of any required length, so that sheets, say, twenty inches wide, that will form a tube of six inches diameter, and, say, five feet long, can be more readily and cheaply procured than sheets of, say, forty-eight inches in width, or such as would be required for a cylinder fifteen inches in diameter; hence several small cylinders can be made and maintained more economically than a single large filter. Again, an apparatus containing a number of separate filtering tubes or cylinders with internally-disposed helical channels arranged within a single main cylinder or inclosing-shell gives a larger combined area of filtering-surface within a given diameter of casing than is given by a single large filtering-cylinder with the helical passage or passages disposed about the outer circumference thereof, as was illustrated and described in my former Letters Patent, No. 280,828. The screw or helically-flanged core being inside holds the felt distended, whereas with an external screw or helix a special frame is required to distend the felt. The parts in large filtering apparatus are more easily handled, and also the several filter-cylinders can be renewed singly without requiring a complete new fitting throughout when but a small part of the material becomes worn or damaged. These considerations apply more forcibly as the size of apparatus is increased.

Another advantage of this construction is that the centrifugal action of the liquid flowing in the helical passages is expended on the inner surface of the felt and exerts its force for removing therefrom the accumulated deposit of sediment.

In this description I have referred to the tubular filtering-cylinders as being made of felt, which is, as I consider, in most instances the best material for filtering purposes. It will, however, be understood that the filtering-cylinders may, when desired, be of cloth, fine wire-gauze, paper, or other substance or material of suitable nature, and such substances used in the manner set forth I include as within the scope of my present invention.

An opening and removable plug are arranged, as at R, for attaching a hose or pipe for injecting water or steam for cleaning off the interior of the shell A, when desired.

What I claim as of my invention, and desire to secure by Letters Patent, is—

1. A filtering apparatus consisting of an inclosing case or cylinder having its interior space separated into chambers, as E', H, and G, and provided with inlet and outlet passages, as set forth, in combination with a series of tubular filters, as D, each supported and distended by an internal shaft, as F, having a helical flange, and a channel, $f$, through which the liquid can flow freely from one of the end chambers, E', to the other end chamber, H, and from which the liquid percolates outward through the filters to the surrounding chamber G, substantially as hereinbefore described.

2. The combination, substantially as hereinbefore described, with the body-cylinder A, base A', cap A², and partition-plates $a$ and $a'$, having openings $e$, of a filter device composed of a standard having a helically-disposed rib and continuous spiral channel leading from the openings $e$ in one plate, $a$, to the openings $e$ in the other plate, $a'$, and the tubular felt D, surrounding and supported by said standard, with the chamber G between said filter in the body-cylinder, from which the filtered water is withdrawn.

3. The combination, substantially as described, with the base A', cap A², and inclosing-cylinder A, of the partition-plates $a$ and $a'$, separating the interior space into chambers, as E', G, and H, and provided with openings $e$, the hollow shaft F, having a helically-disposed flange and intervening channel, $f$, extending from the chamber E to chamber H, the tubular filter D, surrounding said shaft, and the connecting-bolt J, passing through the center of said shaft and connecting the parts, in the manner set forth.

Witness my hand this 18th day of July, A. D. 1885.

JOHN HOWES.

Witnesses:
CHAS. H. BURLEIGH,
H. A. DAVIDSON.